Patented Oct. 2, 1945

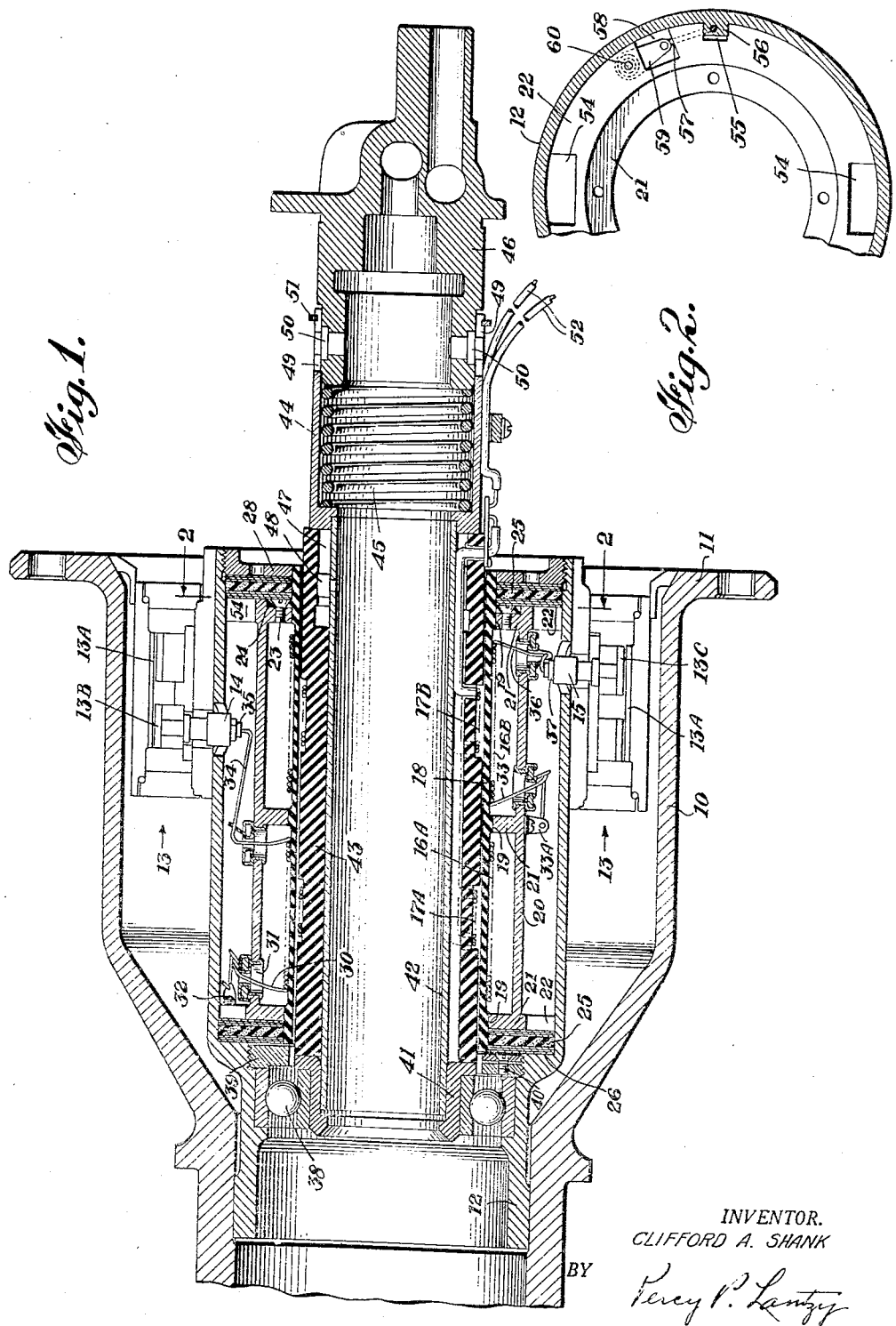

2,386,008

UNITED STATES PATENT OFFICE 2,386,008

TORQUE MEASURING DEVICE

Clifford A. Shank, Jackson Heights, N. Y., assignor to Federal Telephone and Radio Corporation, New York, N. Y., a corporation of Delaware Application January 26, 1944, Serial No. 519,745

12 Claims. (Cl. 73—136)

The present invention relates to improvements in torque measuring devices, and more particularly to devices of the type in which measurement of torque is based upon the twist developed in a predetermined length of shafting or other power-transmitting mechanism when under load conditions.

It is known to mount on spaced-apart sections of a shaft, separate members which have extending portions acting as plates of a condenser. When the shaft is rotated under load, the twisting of the shaft causes a displacement of these extending portions relative to one another. If the portions are incorporated in a suitable electrical circuit, the resulting change in capacity between the portions can be employed to affect the electrical characteristics of the circuit. Since the change in capacity is a function of the torque on the shaft, a measurement of the latter may be obtained directly on a suitable indicator.

In mechanisms of the above type it is necessary that both member portions constituting the condenser plates rotate with the shaft. Since the remainder of the circuit, as well as the indicating apparatus, is usually stationary, some form of electrical coupling between the parts is necessary. This is customarily obtained by providing a rotating coil inductively coupled to a stationary coil, the former being connected to one of the condenser plates and the latter to the measuring circuit.

However, certain difficulties have been experienced in such arrangements. One of these lies in providing proper electrical shielding for the coils. Another difficulty is that of preventing any shift in relative coil position that will alter the necessarily delicate coupling ratio between the rotating and stationary coils. Still another problem is that of providing a torque meter coil construction that will incorporate the above features and still permit the parts to be quickly and easily assembled, or as readily taken apart for inspection and/or repair.

In one type of coil shielding construction proposed, two cylindrical shield sections are joined together by means such as soldering. Since the solder does not completely fill the space between the sections, a number of air gaps result. Furthermore the solder is necessarily unevenly distributed along the junction of the sections. All of the above tends to create an unbalance of the shielding which detracts from the accuracy of the measurements.

Furthermore, when coaxially mounted rotating and stationary coils such as used in many torque meters are in position, it is necessary that any predetermined coupling ratio between the two be maintained under all operating conditions. The reason for this is obvious, since a change in such ratio will cause a change in measurement which will naturally be attributed to an actual change in torque. Prior art devices are generally lacking in positive means for preventing these undesired coupling changes.

Not only must the above conditions be fulfilled but the resulting arrangement must in addition be readily demountable. In the aforementioned proposed design in which two shielding sections are joined by soldering, for example, it is difficult to subsequently separate the sections.

One object of the present invention, therefore, is to provide, in a mechanism having fixed and rotating coils, an improved form of shield for the rotating coil member that is electrically balanced throughout.

A further object of the present invention is to provide means for preventing undesired coupling changes between fixed and rotating coils due to a lateral change in position of the fixed coil relative to the rotating coil.

A still further object of the invention is to provide a member for shielding a plurality of longitudinally spaced-apart coil portions one from the other, this member being constructed as a single unit having integrally-formed projections cooperating with the coil support to substantially enclose each coil portion.

An additional object of the invention is to provide an improved form of torque meter construction in which all of the parts may be quickly and easily assembled and disassembled.

Other objects and advantages will be apparent from the following description and from the drawing, in which:

Fig. 1 shows a longitudinal section of an improved form of torque meter construction in accordance with the present invention; and Fig. 2 is an end view of the rotating coil shield of Fig. 1 along lines 2—2, also showing the method of grounding such shield to the torque tube.

In the drawing 10 designates a power-transmitting member the torque on which is to be measured. It will be understood that although this power-transmitting member is shown as having a particular shape or outline, nevertheless members of many other configurations, such for example as a hollow cylindrical shaft, may obviously be substituted therefor. The flanged end portion 11 of the member 10 is adapted to be connected to some element of the power source itself such as the flywheel. The other end of the member 10 is connected to a load.

Securely joined to power-transmitting member 10 at some point thereon removed from flange 11 is an inner torque tube 12, this junction of member 10 and tube 12 being made in some preferred manner as by a shrink fit. As shown in the drawing, torque tube 12 is substantially coaxial with member 10.

When rotating under load conditions, an angular displacement will be developed along power-transmitting member 10 between the point at which tube 12 is connected, on one hand, and the flanged end 11 on the other. With respect to torque tube 12, however, this tube is secured at but one point (that point being the connection to power-transmitting member 10), and no appreciable displacement will occur along its length. The result of the above will be a rotary displacement between the free end of tube 12 and the flanged end 11 of member 10.

A condenser assembly generally indicated as 13 in the drawing is provided to make use of this relative displacement of members 10 and 12. This condenser assembly is of known design, and will not be described in detail. It is sufficient to say that one set of plates 13A of the assembly is joined to, and rotates with, the flanged end portion 11 of power-transmitting member 10. Other plates 13B and 13C are joined to and rotate with torque tube 12.

Plates 13A are grounded. Plates 13B are connected to the socket 14 of a plug and socket assembly. Plates 13C are connected to the socket 15 of a second plug and socket assembly. Thus when power-transmitting member 10 is under load, a displacement will occur between plates 13A, on one hand, and plates 13B and 13C on the other. The change in capacity of the condenser assembly 13 as a result of this displacement is used to obtain a measurement of the torque on member 10.

To provide means for conveying the capacity changes of condenser assembly 13 to an electrical measuring circuit (not shown), two coils are provided. Each of these coils is of conventional helical shape and is divided longitudinally into two spaced-apart portions. One of these coils, having portions 16A and 16B, is coaxial, and rotates synchronously, with torque tube 12. The other of the coils, having corresponding longitudinally spaced-apart portions 17A and 17B, is coaxially mounted with the rotating coil but is itself secured against rotation in a manner hereinafter to be described.

Considering first the rotating coil and its associated elements, the coil portions 16A and 16B are wound on a tubular form or support 18 composed of some suitable insulating material such as Bakelite. The outer surface of coil support 18 is formed with three spaced-apart annular ridges 19, these ridges 19 being so spaced as to lie respectively between and at the outer ends of coil portions 16A, 16B as shown.

A hollow cylindrical coil shield 20, preferably formed of some suitable shielding material such as brass or aluminum, is coaxial with coil portions 16A and 16B. This shield 20 encircles these coil portions, and is designed with three integrally-formed inwardly-projecting ribs 21. These three ribs 21 are oppositely disposed to the ridges 19 of coil support 18, and closely contact the outer surface of these ridges so that no air gaps remain between the corresponding ridge portions of the coil support and the shield ribs. The resulting assembly provides two substantially completely enclosed spaces respectively containing the coil portions 16A and 16B.

The coil shield 20 has outwardly flanged ends 22 forming extensions of the end ribs 21. The outer diameter of these flanged ends 22 is approximately equal to the inner diameter of torque tube 12, so that these elements are in close fitting relation. The rotating coil assembly is thus positioned to eliminate radial movement within the torque tube 12.

To fasten the coil shield 20 securely to the coil support 18, a plurality of screws 23 are employed. To permit use of these screws, the ridge 19 of coil support 18 nearest the free end of torque tube 12 is provided with a flanged extension 24, and an annular recess is cut out of the corresponding rib 21 of shield 20 to receive this extension 24. Threaded openings in rib 21 then permit the screws 23 to secure together the rib and the flanged extension.

To position the rotating coil assembly against longitudinal movement within torque tube 12, a pair of washer units 25 are provided respectively adjacent each flanged end 22 of shield 20. Each of these washer units consists of two washers preferably composed of Bakelite, and having between them a further washer of some suitable sealing material such as "Neoprene." The washer unit at one end of the assembly abuts a shoulder 26 of torque tube 12. Adjacent the other washer unit is a threaded securing ring 28 engaging a threaded inner portion of torque tube 12, the securing ring 28 thus acting to compress together the sealing washers of the units due to the limiting action of shoulder 26.

One end of each of the coil portions 16A and 16B is grounded to the coil shield 20, the coil portion 16A being grounded by a lead 30 passing through an insulated opening 31 in shield 20, and being secured to a flanged end 22 of shield 20 by a lug 32. One end of coil 16B is grounded in a similar manner by a lead 33 joined to a lug 33A. The ungrounded end of coil 16A is connected by a lead 34 to a plug 35 receivable in socket 14. The ungrounded end of coil 16B is connected in a similar manner by a lead 36 to a plug 37 receivable in socket 15. Leads 33, 34 and 36 pass through insulated openings in shield 20 similar to the opening 31.

By the above mode of assembly, and particularly because of the close fit between the corresponding ridged portions of the coil support and the ribs of the shield, a shielding for the rotating coil portions is obtained that is in nearly perfect electrical balance, and which serves to substantially completely isolate the rotating coil portions one from the other. Much greater accuracy in torque measurement is thereby possible.

The stationary or fixed coil assembly will now be considered. This consists of a bearing assembly 38 held in place within torque tube 12 by a threaded securing ring 39 having a locking screw 40. A bearing collar 41 serves to position in rotational relation with torque tube 12 a tubular mounting member 42, this member 42 being of course coaxial with tube 12.

Encircling mounting member 42 is a coil form 43 of some suitable insulating material such as Bakelite, on which are wound stationary coil sections 17A and 17B. One end of coil form 43 lies adjacent the turned over end portion of collar 41, this collar serving to space mounting member 42 in fixed position radially with respect to coil support 18, and to position coil form 43 in fixed position longitudinally in respect to coil support 18, assuming that some means tend to keep the end of coil form 43 adjacent collar 41. This latter means will now be described.

Partially encircling the outer end of mounting member 42 is a tubular spring holder 44 having therein a spring 45. One end of spring holder 44 is securely affixed to the end of mounting member 42 by some preferred means such as silver soldering. This same end of holder 44 presses against the outer end of coil form 43 as illustrated. The other end of holder 44 partially encircles in telescoping relation a cylindrical portion of a member 46 serving as a connector to some stationary external device such as part of an engine assembly. As shown, this member 46 forms part of a propeller shaft oil inlet, but obviously may be any other element connectable to a stationary external device.

Spring 45 thus provides means for keeping the stationary coil assembly under pressure against the bearing collar 41, and thereby prevents any relative longitudinal movement between coil support 18 and coil form 43 during rotation of the former. The coupling between the coil portions 16A and 17A, therefore, as well as between coil portions 16B and 17B, will not be undesirably affected by vibration or other factors tending to produce a relative longitudinal movement between the fixed and rotating coils.

A longitudinal slot 47 is cut in the interior surface of coil form 43, and a pin 48 riding in this slot and receivable in an opening in mounting member 42 tends to prevent any relative angular displacement of elements 42 and 43.

It has been stated that spring holder 44 and stationary connector member 46 are in telescoping relation. To prevent rotation of holder 44, a pair of longitudinal slots 49 are cut in the spring holder, and a pair of pins 50 positioned in connector member 46 respectively ride in these slots. A retaining ring 51 limits the extent to which members 44 and 46 may be drawn apart.

One end of each of coil sections 17A and 17B is respectively connected to one of a pair of shielded transmission line conductors 52, the connections being preferably molded within the Bakelite coil form 43. The other end of each of coil sections 17A and 17B is grounded to the shield of the transmission line conductors.

Referring now to Fig. 2, there is shown the inner torque tube and the rotating coil shield of Fig. 1 taken along the line 2—2, with the coil support 18 and its flanged extension 24 removed.

As shown in Fig. 2, one outwardly flanged end 22 of coil shield 20 is provided with two oppositely-disposed openings 54 therein. The other flange is provided with like openings, as can be seen from Fig. 1. The purpose of openings 54 of Fig. 2 is to permit plugs 35 and 37 to be respectively inserted in sockets 14 and 15 after the rotating coil assembly is placed within torque tube 12, this insertion being accomplished by means of long-fingered pincers which can reach the plugs 35 and 37 through openings 54 before washer unit 25 and securing ring 26 are in place.

Fig. 2 also shows a method of positively grounding the coil shield 20 to the torque tube 12. The end flange 22 of shield 20 is provided with a niche 55 on the periphery thereof. A corresponding tab or projection 56 on the inner surface of torque tube 12 fits into this niche 55. A pin-shaped opening in tab 56 is adapted to receive a wire 57 which is then soldered in place.

A further opening 58 is provided in flange 22 adjacent tab 56. Near the edge of this opening 58 a soldering lug 59 is secured to flange 22 by means such as a bolt 60. After the rotating coil assembly is in place within the torque tube 12, (tab 56 now being in place within niche 55), the loose end of wire 57 is soldered to the lug 59 through the opening 58. Thus a positive ground connection is obtained for the shield 20, and also for the rotating coil leads 30 and 33 which are secured to the shield by means of lugs 32 and 33A. It should also be noted that in addition to serving as part of the ground connection, tab 56 together with niche 55 prevents any relative rotation of shield 20 and torque tube 12.

While I have described above the principles of my invention in connection with specific apparatus, it is to be clearly understood that this description is made only by way of example and not as a limitation on the scope of my invention as set forth in the objects of my invention and the accompanying claims.

I claim:

1. In a coupling device including a fixed coil within a rotating coil, said rotating coil being formed in two longitudinally spaced-apart sections, said fixed coil being likewise formed in two longitudinally spaced-apart sections, the two coils being coaxially mounted so that the sections of the rotating coil are respectively coupled to the sections of the fixed coil, the combination of a tubular support on which is wound said rotating coil, said support having an annular ridge on the outer surface thereof intermediate said coil sections and a further pair of ridges respectively adjacent the ends of said coil sections, and a hollow cylindrical shield substantially encircling said tubular support, said shield having three integrally-formed ribs on the inner surface thereof positioned for respective engagement with the ridges of said coil support, and means attaching said shield to said coil support.

2. A coupling device according to claim 1, further comprising a tube of insulating material on which is wound said fixed coil, a hollow cylindrical support within said tube, a tubular spring holder secured to one end of said support, a spring within said holder, a stationary positioning member for said spring holder, said positioning member having a cylindrical portion engaging said spring holder in slidable telescoping relation therewith, means preventing relative rotation between said spring holder and said positioning member, and means at the opposite end of said support from said spring holder for engaging said tube to limit the longitudinal movement thereof, whereby said spring will tend to compress said tube between said last-mentioned means and said spring holder.

3. In combination, a cylindrical coil form of insulating material, said coil form having three spaced-apart annular ridges on the outer surface thereof, a pair of coils, said coils being respectively wound on said form in the spaces between said ridges, a cylindrical shield co-axial with said coil form and enclosing said coils, said shield being constructed as a single piece of conducting material having its ends flanged radially inward to form a pair of ribs, said shield also having an integrally-formed inwardly-projecting rib intermediate its ends, the two outer ridges of said coil form respectively engaging the end ribs of said shield, and the inner ridge of said coil form engaging said intermediate rib, whereby two substantially closed chambers will be established each containing one of said coils, and means securing said shield to said coil form.

4. The combination of claim 3, with two pairs of openings in said shield disposed 180° apart on opposite sides of said intermediate rib, each pair of openings permitting passage therethrough of connections to one of said coils.

5. The combination of claim 3, in which said ribs respectively engage said ridges along surfaces which are substantially cylindrical and coaxial with said coil form and said shield.

6. In combination, a one-piece hollow cylindrical shield, a tubular form, and a plurality of coil sections wound on said tubular form in longitudinal spaced-apart relation, said shield adapted to substantially enclose said coil sections and being provided with one or more integrally-formed ribs projecting radially inward so as to respectively contact said form in the spaces between said coil sections.

7. In a torque measuring device for a hollow rotatable power-transmitting member, the combination of a torque tube within and secured to said power-transmitting member, a rotating coil assembly and a stationary coil assembly within said torque tube, said rotating coil assembly comprising a tubular support securely positioned to rotate coaxially with said torque tube, a coil on said support, said coil having a pair of longitudinally spaced-apart sections, a one-piece hollow cylindrical coil shield secured to said support, said shield substantially enclosing said coil and being provided with three integrally-formed ribs projecting radially inward so as to contact said support outside the ends of and between said coil sections, respectively, said stationary coil assembly comprising a second tubular support positioned within said first-mentioned support, a second coil wound on said second support, said second coil having a pair of longitudinally spaced-apart sections for respective association with the spaced-apart sections of said first-mentioned coil, means mounted on said torque tube for maintaining said two supports in fixed coaxial relation while permitting relative rotary movement therebetween, means securing said second support against rotation, and means acting to prevent relative longitudinal movement between said two supports during rotation of said rotating coil assembly.

8. A torque measuring device according to claim 7 in which said last-mentioned means includes a resilient member.

9. A torque measuring device according to claim 7, further comprising three annular ridges on said first-mentioned coil support, said ridges being respectively located outside the ends of and between said rotating coil sections, the ribs of said coil shield being spaced to respectively engage said ridges.

10. A torque measuring device according to claim 7, in which said coil shield is provided with an outwardly-flanged portion engaging said torque tube, said flanged portion having a niche in the periphery thereof, further comprising a projection on the inner surface of said torque tube and receivable in said niche, a lead connected to said projection, a lug on said flanged portion, and means connecting said lead to said lug.

11. A torque measuring device according to claim 7, in which said means securing said second support against rotation is formed with a cylindrical portion, in which said second support is provided with a tubular insert, and in which said means acting to prevent relative longitudinal movement between said two supports during rotation of said rotating coil assembly includes a tubular spring holder secured to one end of said tubular insert and engaging the cylindrical portion of said securing means in slidable telescoping relation, and a spring within said spring holder engaging the cylindrical portion of said securing means.

12. A coupling device according to claim 1 in which said means includes an annular cut-out portion on one of the ribs of said shield, an outwardly-flanged portion on the corresponding ridge of said tubular support adapted to be received within the cut-out portion of said one rib, and means for securing together said one rib and said flanged portion.

CLIFFORD A. SHANK.